United States Patent
Kostarigka et al.

(10) Patent No.: US 12,227,167 B2
(45) Date of Patent: Feb. 18, 2025

(54) METHOD OF CONTROLLING A VEHICLE DRIVETRAIN AND CONTROLLER IN THE DRIVETRAIN

(71) Applicant: Vitesco Technologies Germany GMBH, Hannover (DE)

(72) Inventors: Artemis Kostarigka, Nuremberg (DE); Ruben König, Hemsbach (DE)

(73) Assignee: Vitesco Technologies Germany GmbH, Hannover (DE)

( * ) Notice: Subject to any disclaimer, the term of this patent is extended or adjusted under 35 U.S.C. 154(b) by 178 days.

(21) Appl. No.: 17/929,817

(22) Filed: Sep. 6, 2022

(65) Prior Publication Data
US 2023/0071874 A1    Mar. 9, 2023

Related U.S. Application Data

(63) Continuation of application No. PCT/EP2021/055575, filed on Mar. 5, 2021.

(51) Int. Cl.
*B60W 20/30* (2016.01)
*B60W 10/08* (2006.01)
(Continued)

(52) U.S. Cl.
CPC ............ *B60W 20/30* (2013.01); *B60W 10/08* (2013.01); *B60W 10/11* (2013.01); *B60W 20/15* (2016.01);
(Continued)

(58) Field of Classification Search
CPC ...... B60W 20/30; B60W 10/08; B60W 10/11; B60W 20/15; B60W 20/50; B60W 50/06; B60W 2510/0638; B60W 2510/083; B60W 2510/104; F16H 61/0403; F16H 63/502; F16H 2061/0422; F16H 2061/0474; Y02T 10/62
(Continued)

(56) References Cited

U.S. PATENT DOCUMENTS

| 8,965,650 B1 * | 2/2015 | Otanez ................. B60W 20/40 701/67 |
| 2012/0259494 A1 * | 10/2012 | Schaeffer ............... B60K 6/387 701/22 |

(Continued)

FOREIGN PATENT DOCUMENTS

| CN | 104842992 A | 8/2015 |
| DE | 102006019239 A1 | 10/2007 |

(Continued)

OTHER PUBLICATIONS

Japanese Notice of Allowance dated Nov. 15, 2023 for corresponding Japanese Patent Application No. 2022-553098.
(Continued)

*Primary Examiner* — Muhammad Shafi

(57) ABSTRACT

A method of controlling a vehicle drivetrain by an electric motor, in order to synchronize the speed of an internal combustion engine and the speed of gears in the drivetrain, wherein if a speed synchronization error $e_{sync}(t)$ is controlled (Continued)

to remain within a prespecified region for a specific period of time, the synchronization is finished, and a gear may be engaged.

15 Claims, 8 Drawing Sheets

(51) Int. Cl.
| | | |
|---|---|---|
| B60W 10/11 | (2012.01) | |
| B60W 20/15 | (2016.01) | |
| B60W 20/50 | (2016.01) | |
| B60W 50/06 | (2006.01) | |
| F16H 61/04 | (2006.01) | |
| F16H 63/50 | (2006.01) | |

(52) U.S. Cl.
CPC ............ *B60W 20/50* (2013.01); *B60W 50/06* (2013.01); *F16H 61/0403* (2013.01); *F16H 63/502* (2013.01); *B60W 2510/0638* (2013.01); *B60W 2510/083* (2013.01); *B60W 2510/104* (2013.01); *F16H 2061/0422* (2013.01); *F16H 2061/0474* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2015/0051799 | A1* | 2/2015 | Maloum | ............. F16H 61/0437 903/945 |
| 2019/0152470 | A1* | 5/2019 | Liu | ....................... B60W 10/06 |

FOREIGN PATENT DOCUMENTS

| | | | |
|---|---|---|---|
| FR | 2954441 | A1 | 6/2011 |
| FR | 2988799 | A1 | 10/2013 |
| FR | 3034834 | * | 10/2016 |
| FR | 3034834 | A1 | 10/2016 |
| JP | 2003314592 | A | 11/2003 |
| JP | 2017013752 | A | 1/2017 |

OTHER PUBLICATIONS

Chinese Office Action dated Nov. 8, 2023 for corresponding Chinese Patent Application No. 202180019341.1.
Hongxu, Chen, Sayan Mitra, Synthesis and Verification of Motor-Transmission Shift Controller for Electric Vehicles, Apr. 14, 2014.
Z, Zhong, et al, Shifting Control of an Automated Mechanical Transmission Without Using the Clutch, Dec. 11, 2011, p. 487-496.
Tseng, et al, Advanced Shifting Control of Synchronizer Mechanisms for Clutchless Automatic Manual Transmission in an Electric Vehicle, Feb. 2015, vol. 84.
Charalampos, et al, Robust Adaptive Control of Feedback Linearizable MIMO Nonlinear System with Prescribed Performance, IEEE Transactions on Automatic Control. Vol 53 No. Oct. 9, 2008 p. 2090-2009.
Benben, et al, Robust Shifting Control of a Motor-Transmission Integrated System Considering Anti-Jerking and Speed Regulation for Electric Vehicles; IEEE Xplore Digital Library vol. 13 Issue 1 2019, Jan. 3, 2019 pp. 141-152.
Liu, et al, Gear Shift Strategy for a Clutchless Automated Manual Transmission in Battery Electric Vehicle; SAE International Journal of Commercial Vehicles; 5. 57-62.
Wanke, et al, Speed Synchronization Control of Integrated Motor-Transmission Powertrain over CAN through Active Period-Scheduling Approach; MDPI-Energies; 2017; pp. 1-17.
Chai, B.; Compound Optimal Control for Shirt Process of a Two-Speed Automatic Mechanical Transmission in Electric Vehicles; Proceedings of the Institution of Mechanical Engineers, Part D: Journal of Automobile Engineering; Jun. 20, 2018.
Yulong, et al; Control Strategy of Automated Manuel Transmission Base on Active Synchronisation of Driving Motor in Electric Bus; Advances Mechanical Engineering; 2019 vol. 11(4) p. 1-17.
Chi-Hsien, et al; Smooth gear-change Control for EV Clutchless Automatic Manual Trasmission ; IEEE; Aug. 13, 2012.
Sun, et al; Analysis and Control of Shift Process for AMT without Synchronizer in Battery Electric Bus; Paris France; 2012.
Wang, et al; Gear-Shifting Control of Clutchless Automated Mechanical Transmission Without Synchronizer in Short-distance Pure Electric Vehicle; China Journal of Highway and Transport; No. 02; 2017.
Walker et al; Dynamics and Control of Clutchless Automated Manual Transmission for Electric Vehicles; Journal of Vibration and Acoustics, ASME; Dec. 2017.
Zhu, et al, Robust Speed Synchronization Control for Clutchless AMT System in Electric Vehicles; Proceedings of the Institution of Mechanical Engineers Part D; ResearchGate; Oct. 23, 2015.
Zhu, Xiaoyuan, Speed Synchronization Control for Integrated Automotive Motor-Transmission Powertrain System with random delays; Mechanical Systems and Signal Processing; Dec. 2015.
Huang et al, Robust Speed Synchronization Control for an Integrated Motor-Transmission Powertrain System with Feedback Delay; SAE Technical Paper 2019.
Chih-Hsien Yu et al, Research on gear-change control technology for the clutchless automatic-manual transmission of an electric vehicle; Proceedings of the Institution of Mechanical Engineers, Part D: Journal of Automobile Engineering; May 10, 2013.
Stewart, et al., Dynamic Model Tracking Design for Low Inertia Hight Speed Permanent Magnet AC Motors, ISA Transaction vol. 43, Issue 1, Jan. 2004 pp. 111-122.
Breen J. et al, Clutchless Shifting of an Automated Manual Transmission in a Hybrid Powertrain; SAE Technical Paper 2011.
Zhu, Xiaoyuan, et al; Robust Control of Integrated Motor-Transmission Powertrain System Over Controller Area Network for Automotive Applications; Mechanical Systems and Signal Processing; 58-59 2015 pp. 15-28.
Wang, Junqiang, et al; Robust Speed Synchronization Control for Clutchless AMT Systems in Electric Vehicles, Proceedings of the Institution of Mechanical Engineers Part D Journal of Automobile Engineering; Aug. 2014.
Kim, S.J.et al; Analysis of the Shifting Behavior of a Novel Clutchless Geared Smart Transmission; International Journal of Automotive Technology, vol. 15, No. 1 2014 pp. 125-134.
Young-Ki et. al; A Speed Control for the Reduction of the Shift Shocks in Electric Vehicles with a Two-Speed AMT; Journal of Power Electronic, vol. Jul. 16, 2016 p. 1355-1366.
Zhu, Xiayuan, et al; Optional Speed Synchronization Control for Clutchless AMT Systems in Electric Vehicles with Preview Actions; American Control Conference (ACC) Portland , Oregon; Jun. 4-6, 2014, pp. 4611-4616.
Wanke Cao et al; Speed Synchronization Control for Integrated Automotive Motor-Transmission Powertrains Over CAN Through a Co-Design Methodology; IEEE Acess; Mar. 28, 2018 pp. 14106-14117.
International Search Report and Written Opinion dated May 14, 2021 from corresponding International Patent Application No. PCT/EP2021/055575.
GB Search Report dated Sep. 8, 2020 from corresponding Patent Application No. 2003270.2.

\* cited by examiner

METHOD OF CONTROLLING A VEHICLE DRIVETRAIN AND CONTROLLER IN THE DRIVETRAIN

CROSS-REFERENCE TO RELATED APPLICATIONS

This application claims priority to PCT Application PCT/2021/055575, filed Mar. 5, 2021, which claims priority to United Kingdom Patent Application No. GB 2003270.2, filed Mar. 6, 2020. The disclosures of the above applications are incorporated herein by reference.

BACKGROUND OF THE INVENTION

Automatic transmissions generally include at least one gear set and a plurality of shift elements. Selective actuation of the shift elements adjusts the gear ratio of the automatic transmission and shifts the automatic transmission between its various gears.

In dedicated hybrid transmission (DHT) at least one secondary power source such as an electric motor is integrated with a combustion engine to enable electric driving, improve fuel consumption and driving performance.

Automated engagements of dry or wet clutches in cars and trucks are typically used for the actuation of energy flow management. Several control algorithms for synchronization have been proposed in literature, based on techniques such as fuzzy logic, optimal control, feedback linearization and PI control.

Certain automatic transmissions include dog clutch shifting elements. During various gear shifts, the dog clutch is engaged. Dog clutches are generally smaller, less expensive and more efficient than friction clutches (dry or wet) or synchronizers. Yet, engaging the dog shows certain challenges. For example, the dog clutch has to generally be synchronized prior to engaging the dog clutch. When the dog clutch is synchronized, components of the dog clutch rotate at a common speed. Conversely, such components may grind against each other and make a loud noise or even be damaged if the dog clutch is engaged while the dog clutch is not synchronized. However, synchronizing the dog clutch can be difficult and time consuming. A separate synchronizing mechanism, such as a synchronizer, can consume valuable space within a transmission and add to an overall cost of the automatic transmission.

In a hybrid powertrain system without friction clutches and without synchronizers, the engine speed has to be controlled precisely in order to synchronize the gears, favorably by an electric machine. One of the most important performance indices that affect the quality of a gear change is the shifting duration, which is in turn closely related to the speed synchronization performance. Controller's priority should be fast and accurate tracking control of a speed reference trajectory as dictated by the vehicle speed and the selected gear. However, many exogenous parameters such as unmodelled dynamics, unknown load disturbances and delays might significantly deteriorate the desired performance or even induce instabilities. Therefore, speed synchronization process needs to be robust with respect to unmodelled dynamics, model uncertainties, unknown load torque disturbances and system delays.

In order to improve transient response of the system, early solutions, as well as most industrial applications, have used feedforward control or combined feedforward with feedback action to improve accuracy and ensure closed loop stability. Other common speed synchronization techniques use conventional P/PI/PID control sometimes combined with pole placement to boost transients. To enhance the speed regulation control capability, many scientists used sliding-mode control (SMC) for speed synchronization. SMC has been widely adopted in the controller design since it is very robust to parameter variations and external disturbances. However, SMC tends to cause chattering and a boundary layer is needed, which deteriorates the disturbance rejection capability of the controller. In order to increase robustness, many authors have employed optimization methods like H∞-based LQR (Linear Quadratic Regulator) control with preview actions or open loop optimal control methods (Model Predictive Control). However, H∞ controllers are being over conservative and sacrifice transient responses. Moreover, optimization control methods either require the solution of a linear matrix inequality (LMI), which is a rather tedious task, or are computationally demanding, which is an important performance index in embedded solutions, rendering their implementation on embedded control systems hard. Other robust methods include disturbance observers to ensure disturbance rejection.

There are different problems associated with the existing solutions:

Model based controller solutions in feedforward and feedback combination heavily rely on the exact knowledge of the systems dynamics and can deteriorate its performance when not modelled accurately. They are vulnerable in the case of erroneous system model, unknown dynamics and disturbances.

The performance of conventional P/PI/PID control might be insufficient when dealing with unknown disturbances and high speed and accuracy is demanded. Model uncertainties might lead eventually to poor performance, arising closed loop stability issues.

Sliding mode control tends to cause chattering and a boundary layer is needed, which deteriorates the disturbance rejection capability of the controller.

H∞ controllers are being over conservative and sacrifice transient responses.

Optimal control solutions (LQR/MPC) require solution of linear matrix inequality (LMI), which is a cumbersome task and increases the computational effort if done numerically.

Observer based solutions increase complexity of the solution because of complicated control algorithms.

An example of optimization control method is disclosed by Xiaoyuan Zhu, Hui Zhang, Zongde Fang "Speed synchronization control for integrated automotive motor—transmission powertrain system with random delays", Mechanical Systems and Signal Processing, Volumes 64-65, 2015, Pages 46-57, ISSN 0888-3270.

SUMMARY OF THE INVENTION

It is an object of the present invention to provide good quality of engine speed synchronization in gear shifts with dog clutches, by addressing the following requirements:

The demand of fast transient performance and good accuracy despite of system uncertainties and unknown disturbances;

Minimizing the computational efforts and the complexity of the solutions already used to cope with system robustness.

This object is achieved by a method described and a Speed Synchronization Controller (SSC) which is also described.

According to the invention, a method of controlling a vehicle drivetrain by an electric motor in order to synchronize a speed of an internal combustion engine and a speed of gears in the drivetrain is provided. The method employs a Speed Synchronization Controller (SSC) based on Prescribed Performance Control (PPC) technique, which imposes certain pre-defined bounds on the speed synchronization tracking performance by employing a transformation of the speed synchronization error. Specifically, the speed synchronization error is forced to evolve within a predefined region, which is bounded by certain Prescribed Performance Limits. Those limits are defined using a decaying function of time called Performance Function and a Maximum Overshoot Parameter. In order to prohibit hazardous reaction of the system due to controller failure when the speed synchronization error reaches or surpasses the Prescribed Performance Limits, an additional set of safety bounds that lie within the Prescribed Performance Limits is employed, called the Safety Margins.

The method includes the following steps:
I. During initialization of the synchronization cycle at time zero, a synchronization Performance Function, a synchronization Maximum Overshoot Parameter and a corresponding set of Safety Margins are defined, such that the speed synchronization error is initiated within the area defined by the Safety Margins and correspondingly within the Prescribed Performance Limits. A Safety Margin violation flag, which indicates whether the speed synchronization error lies within the area defined by the Safety Margins or not, is initialized to OFF, that signifies that the speed synchronization error lies within this area.
II. At every step of the synchronization cycle, a transformed synchronization error is calculated, by employing a transformation of the speed synchronization error, which imposes the synchronization Prescribed Performance Limits on the speed synchronization error performance. In order to avoid a hazardous controller reaction, the Safety Margins are employed via the Safety Margin violation flag. In case the speed synchronization error reaches the Safety Margins through an abrupt speed change, the Safety Margin violation flag is set to ON and the Prescribed Performance Limits are immediately expanded with the use of a safe Performance Function and a safe Maximum Overshoot Parameter. If, during synchronization, a new target speed is requested ("change-of-mind"), then the synchronization cycle is interrupted and re-initialized with the use of a new synchronization Performance Function and a new synchronization Maximum Overshoot Parameter. At the end of every synchronization cycle step, a requested motor torque is calculated as the output of a Speed Synchronization Controller (SSC), which includes a PPC part and a switching-PI part. The calculated motor torque is set to the Starter-Generator (SG).
III. The synchronization cycle is finished once the speed synchronization error has settled in a prespecified small region around zero for a specific period of time.

In an exemplary embodiment, when the synchronization is finished, a gear in the drivetrain is engaged, e.g. by a command sent by a DHT manager.

In an exemplary embodiment, the synchronization Performance Function, the synchronization Maximum Overshoot Parameter and the Safety Margins are chosen such that the initial speed synchronization error lies within the Safety Margins and correspondingly within the Prescribed Performance Limits.

In an exemplary embodiment, the Safety Margins lie within the Prescribed Performance Limits at all times.

In an exemplary embodiment, the Safety Margins violation flag is set to be OFF or to remain OFF when the speed synchronization error lies within the Safety Margins, which are within and at a safety distance of the Prescribed Performance Limits, and set to be ON or remain ON when the speed synchronization error lies on the Safety Margins or surpasses them.

In an exemplary embodiment, upon an abrupt speed change, if the speed synchronization error is forced to reach the Safety Margins at a time instance, the Prescribed Performance Limits are expanded with the choice of a safe Performance Function and safe Maximum Overshoot Parameter, such that the speed synchronization error continues to evolve within the expanded Prescribed Performance Limits.

In an exemplary embodiment, upon a "change-of-mind" situation, the synchronization cycle is interrupted and re-initialized, using a new Performance Function, which is chosen such that the speed synchronization error continues to evolve within new Prescribed Performance Limits.

In an exemplary embodiment, in order to modulate the speed synchronization error with respect to the required Prescribed Performance Limits, a transformed error is determined using a synchronization Transformation Function or a safe Transformation Function.

In an embodiment, the synchronization Transformation Function and the safe Transformation Function are smooth and strictly increasing, defining bijective mappings such that when the speed synchronization error reaches the Prescribed Performance Limits, the transformed error tends to infinity.

According to another aspect of the present invention, a Speed Synchronization Controller SSC is provided for synchronizing the speed of an internal combustion engine and the speed of gears in a vehicle drivetrain by the method as described above.

In an exemplary embodiment, the Speed Synchronization Controller SSC further includes a Prescribed Performance Control PPC part calibrated to force the speed synchronization error to evolve within the Prescribed Performance Limits.

In an exemplary embodiment, the Speed Synchronization Controller SSC further includes a switching-PI part, which switches between a proportional-integral PI part and proportional P part according to whether the speed synchronization error is within a specific threshold or not.

According to another aspect of the present invention, an electronic control unit is provided for controlling a vehicle drivetrain by the method described above, wherein the electronic control unit includes at least a Speed Synchronization Controller SSC as described above and a DHT Manager configured to supervise the Speed Synchronization Controller.

According to another aspect of the present invention, a vehicle drivetrain is provided, comprising an internal combustion engine coupled to a gearbox configured to transfer torque from the internal combustion engine to an output shaft, wherein the gearbox includes dog clutches, further comprising an electric machine integrated on an input side of the dog clutches in a P0, P1 or P2 configuration and an electronic control unit as described above.

In an exemplary embodiment, the electric machine is a Starter-Generator SG coupled to a crankshaft of the internal combustion engine.

According to the invention, a method is provided to improve gear shifting quality through enhancing speed synchronization performance, and a controller to perform the method based on a recently introduced technique, called Prescribed Performance Control (PPC) is proposed. This technique imposes certain pre-defined bounds on the tracking performance by employing a transformation of the speed synchronization error. The error transformation acts like a barrier function, since it tends to infinity as the actual error approaches the pre-defined bounds of the Prescribed Performance region. The Prescribed Performance region is bounded by certain Prescribed Performance Limits, defined with the use of a decaying function of time called Performance Function and a Maximum Overshoot Parameter. With an appropriate choice of the Performance Function and the Maximum Overshoot Parameter, it is guaranteed that the speed synchronization error converges to a predefined arbitrarily small residual set, with rate no less than a prespecified value, exhibiting maximum overshoot less than a sufficiently small preassigned constant. Moreover, by appropriately parameterizing the controller, it is guaranteed that the speed synchronization error evolves at the center of the Prescribed Performance region, as it is equally repelled by the Prescribed Performance Limits. In this way, the controller performance is smoother, and the speed converges to its desired value with minimum overshoot. The proposed controller is strictly error driven and model free, which in turn makes it robust to system uncertainties and unknown load disturbances. Moreover, its simple form makes the implementation easy, avoiding any cumbersome calculations or computationally demanding executions.

The PPC method is a generic approach to control unknown nonlinear systems. Due to its general form, it attracts a vast area of applications. Some of the most distinguished ones are control of robotic systems, control of autonomous underwater vehicles, control of quadrotor, control of small-scale unmanned helicopters.

The SSC controller, which is disclosed in this invention, includes a PPC part and an extra switching-PI part with conditional integration. Moreover, it was enhanced with safety functionalities to ensure its risk-free application into the actual vehicle system. As the majority of known PPC-related works use simulations to verify the validity of their approach, a major contribution according to this invention is the commissioning and testing of the method into a real system with actual experiments in a moving vehicle.

In principle, the method is not only applicable in P0 or P1 hybrid powertrain but could also be applied in a P2. However, there is usually a friction clutch between the combustion engine and the electric machine P2, which could be used for speed synchronization. Therefore, there is no need or benefit of synchronizing the combustion engine with the electric machine.

In arrangement P3 or P4, this method is not applicable, except if it is a combination with a P0 or P1 machine.

Employing the proposed Speed Synchronization Controller SSC, which includes a combination of a PPC part and a switching-PI part, for engine speed synchronization during gear shifts provides the following:

Prescribed tracking performance of engine speed: engine speed tracking performance is a priori dictated by the appropriate selection of certain designer-specified Performance Functions that encapsulate the desired transient and steady-state performance specifications, Robust, model-free solution: the Speed Synchronization Controller does not incorporate any knowledge of the model dynamics and the external disturbances and doesn't need an estimation or approximators to do so.

It is error driven rather than model-based, which makes it versatile and easily reusable to similarly structured systems, Low complexity of implementation: its structurally simple, linear-like form makes the implementation on embedded control systems straightforward. Moreover, it is computationally efficient in comparison to optimal control or observer-based solutions.

BRIEF DESCRIPTION OF THE DRAWINGS

The present invention will become fully understood from the detailed description given hereinbelow and the accompanying drawings, which are given by way of illustration only, and thus, are not restrictive of the present invention, and wherein.

Corresponding parts are marked with the same reference symbols in all figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
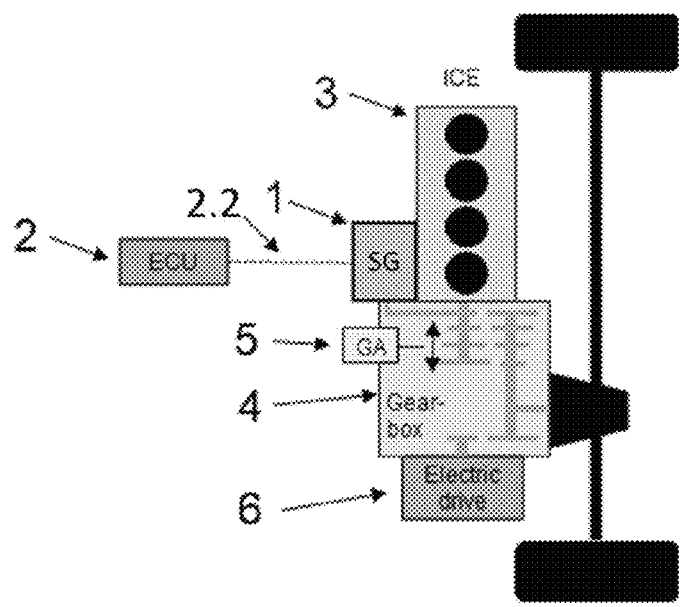
FIG. 1 shows components and an arrangement of an exemplary P1-P3 hybrid drivetrain.

FIG. 1 shows the components and the arrangement of an exemplary P1-P3 hybrid powertrain. An internal combustion engine 3, ICE is coupled to gearbox 4, which transfers the torque over a given amount of gears to the output shaft, which propels the wheels of the vehicle. In a dedicated hybrid transmission (DHT), the gears are changed using dog clutches instead of synchronizers. This makes the gearbox smaller, more efficient and less costly. The function of the synchronizers, matching the speed of the input side, especially the 3, ICE, to the speed of the output side of the dog clutch, which has a speed proportional to the wheels, is done by actively controlling the speed of an electric machine. This electric machine has to be integrated on the input side of the dog clutches, which is the case in P0, P1 and P2 configurations. In the example, shown in FIG. 1, the High-Voltage Starter-Generator 1, SG is connected to the crankshaft of the ICE, which makes this a P1 machine. Whenever the dog clutches are in a neutral position, the ICE and the SG may rotate freely and independent of the speed of the output shaft and thus of the vehicle speed. In order to engage a gear by closing a dog clutch, the speed of the input side is synchronized to the speed of the output side by the SG. A speed control algorithm is used to do this quickly and precisely. The algorithm is implemented on an electronic control unit 2, ECU which has an interface 2.2 to the SG, e.g. a transmission control unit or a powertrain control unit. In principal, the ICE could also be used to control the speed of the input side, but a combustion engine ICE is less dynamic and has strong torque fluctuations, which makes the electric machine SG one solution for the speed synchronization.

Figure 2:
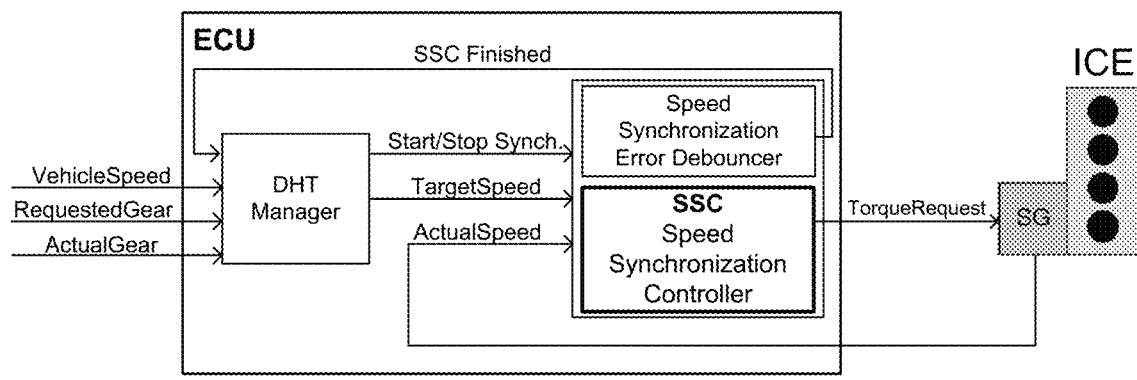
FIG. 2 shows a control software architecture block diagram.

The control software architecture diagram is seen in FIG. 2.

An auxiliary software part, called DHT Manager, shall be implemented in the ECU, to supervise the SSC functionality. A Speed Synchronization Error Debouncer detects and indicates if the speed synchronization error remains within a prespecified region, defined by a predetermined minimum threshold, for a specific time period. Reading the drivetrain signals such as vehicle speed, requested gear and actual gear and monitoring the DHT and SSC state, the DHT Manager shall decide when speed synchronization should take place and when it is safe to proceed to gear engagement.

When the speed of the input and output side are synchronized, the clutch is closed using a gear actuator GA, 5. While SG and ICE are synchronizing, e.g. during a gear change, they cannot deliver torque to propel the vehicle. Therefore, a second electric machine 6 may be used to fill the so-called torque gap during a shift. This electric machine 6 has to be connected to the output side of the dog clutches, which is called the P3 position. In FIG. 1 the second electric drive 6 is integrated in a P3 position.

Problem Statement

The equation of motion of the 3-phase induction motor used as Starter-Generator SG, when no gear is engaged, is $$J_{res}\dot{\omega}_{SG} = T_{SG} + T_{ICE}/i_{SG} \quad (1)$$

where $J_{res}$ is the moment of inertia of the rotating parts, e.g. of the electric machines and the ICE, $T_{SG}$ and $T_{ICE}$ are torques provided by the SG and the ICE, $i_{SG}$ is the gear ratio between SG and ICE and $\omega_{SG}$ is the angular velocity of the rotor of SG.

Speed Synchronization Problem:

SG angular speed $\omega_{sg}(t)$ is requested to track a desired target trajectory $\omega_{tgt}(t)$ as dictated by the vehicle velocity $v_{veh}$ and the desired gear ratio $i_{tgt}$ $$\omega_{tgt} = \frac{v_{veh}}{3.6 \cdot r_{wheel}} \cdot i_{tgt}$$

The goal is to design a state feedback controller, without using any information of the system dynamics, to solve the Speed Synchronization Problem. The speed synchronization should be fast and accurate despite of system uncertainties and unknown disturbances. Moreover, it should be guaranteed that the speed synchronization error converges to a predefined arbitrarily small residual set, with rate no less than a prespecified value, exhibiting maximum overshoot less than a sufficiently small preassigned constant.

Prescribed Performance Preliminaries

This section summarizes preliminary knowledge on Prescribed Performance, originally published by C. P. Bechlioulis and G. A. Rovithakis in "Robust Adaptive Control of Feedback Linearizable MIMO Nonlinear Systems with Prescribed Performance," in IEEE Transactions on Automatic Control, vol. 53, no. 9, pp. 2090-2099, October 2008.

Figure 3A:
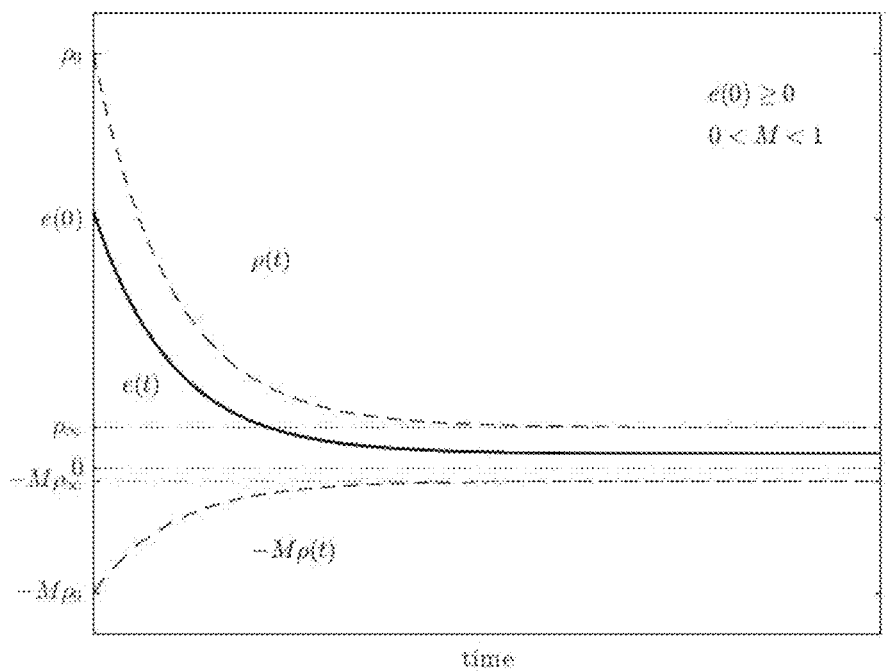
FIG. 3A shows a tracking error and Prescribed Performance Limits in case of $e(0) \geq 0$ and $0 < M < 1$.
Figure 3B:
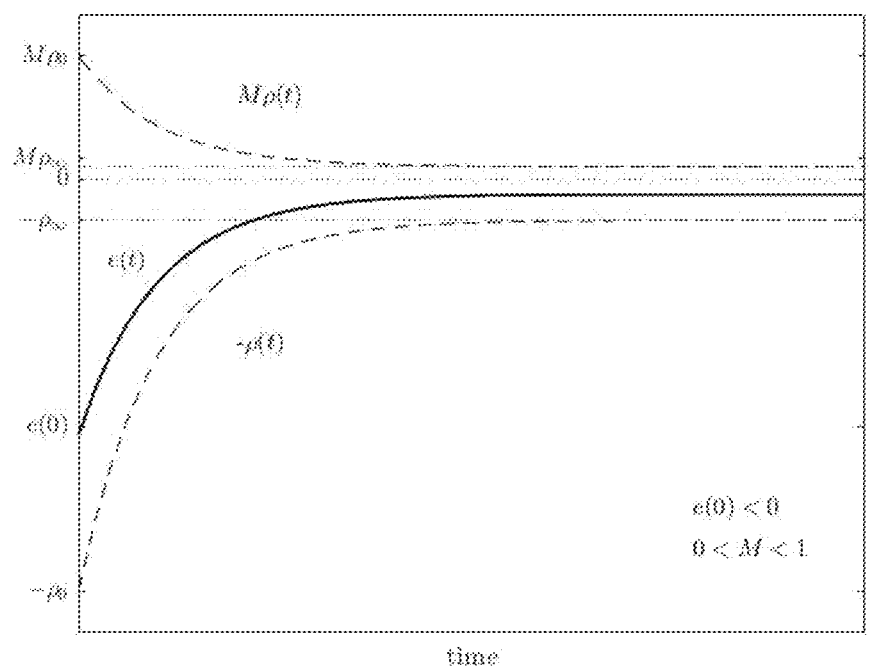
FIG. 3B shows a tracking error and Prescribed Performance Limits in case of $e(0) < 0$ and $0 < M < 1$.

Considering in FIG. 3A and FIG. 3B a generic tracking error $e(t) \in R$, Prescribed Performance is achieved if $e(t)$ evolves strictly within a predefined region that is bounded by a decaying function of time. The mathematical expression of Prescribed Performance is given $\forall t \geq 0$, by the following inequality:

$$-M\rho(t) < e(t) < \rho(t), \forall t \text{ if } e(0) \geq 0$$

$$-\rho(t) < e(t) < M\rho(t), \forall t \text{ if } e(0) < 0 \quad (2)$$

where $0 \leq M \leq 1$ is a Maximum Overshoot Parameter and $\rho(t)$ is a bounded, smooth, strictly positive and decreasing function, satisfying $$\lim_{t \to \infty} \rho(t) = \rho_\infty > 0,$$

called Performance Function. The aforementioned statements are illustrated in FIG. 3A and FIG. 3B for an exponential Performance Function $\rho(t) = (\rho_0 - \rho_\infty)e^{-lt} + \rho_\infty$, with $\rho_0$, $\rho_\infty$, l strictly positive constants and Maximum Overshoot Parameter M, where in FIG. 3A is depicted the case of $e(0) \geq 0$ and $0 < M < 1$, whereas in FIG. 3B is depicted the case of $e(0) < 0$ and $0 < M < 1$.

Figure 4A:
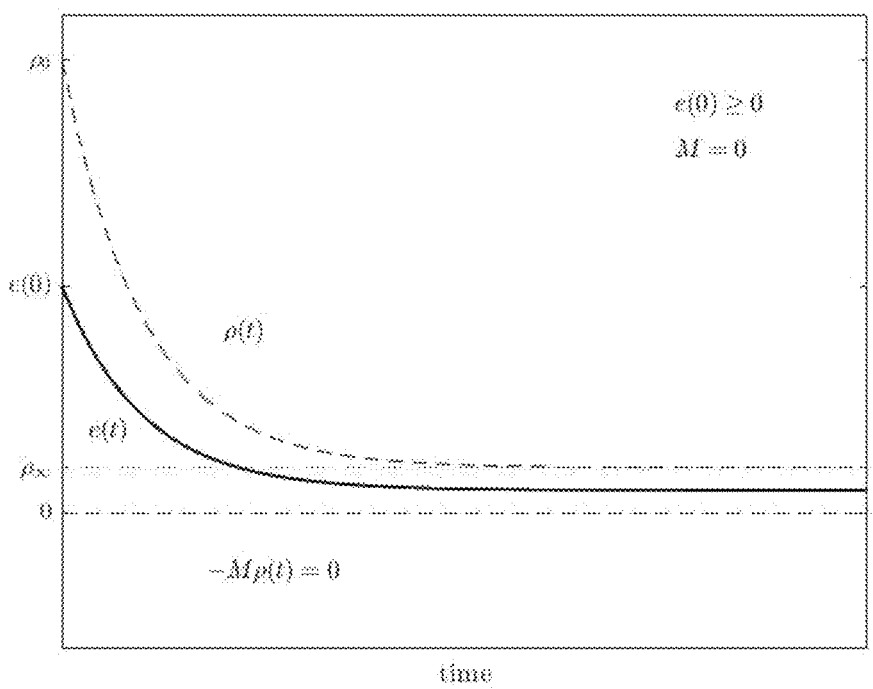
FIG. 4A shows a further tracking error and Prescribed Performance Limits in case of $e(0) \geq 0$ and $M=0$.
Figure 4B:
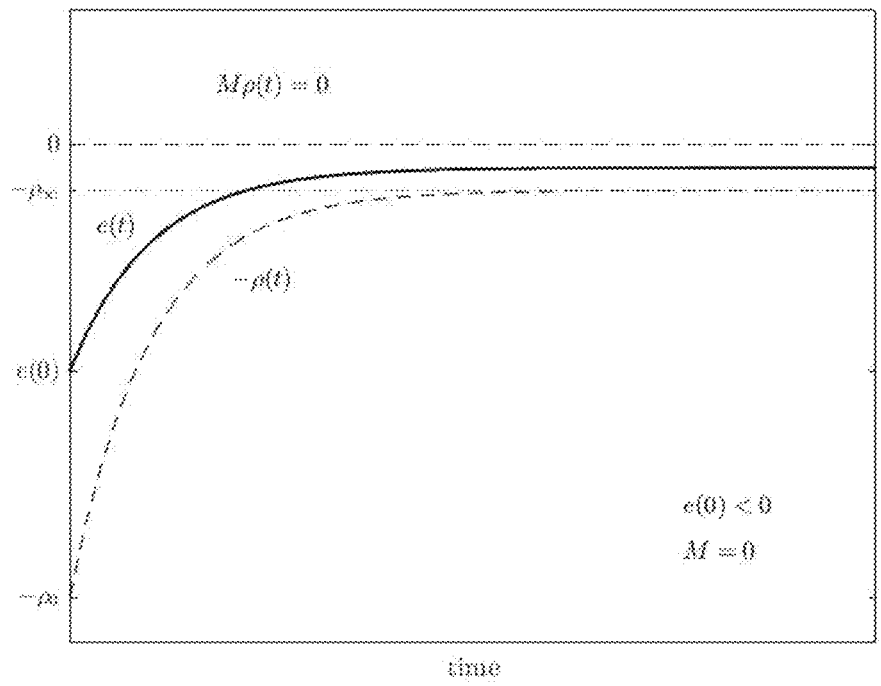
FIG. 4B shows a further tracking error and Prescribed Performance Limits in case of $e(0) < 0$ and $M=0$.
Figure 5A:
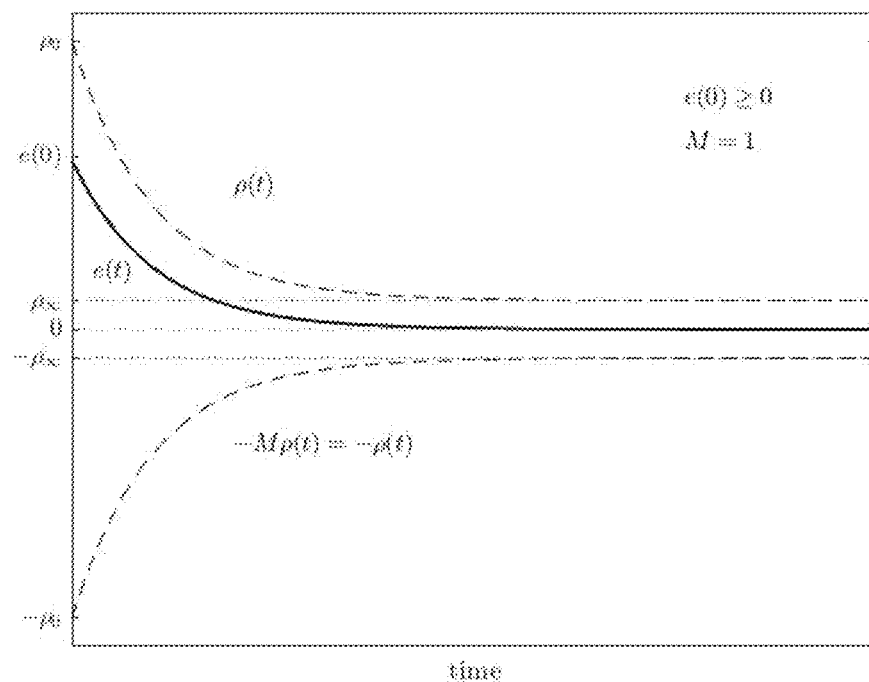
FIG. 5A shows a further tracking error and Prescribed Performance Limits in case of $e(0) \geq 0$ and $M=1$.
Figure 5B:
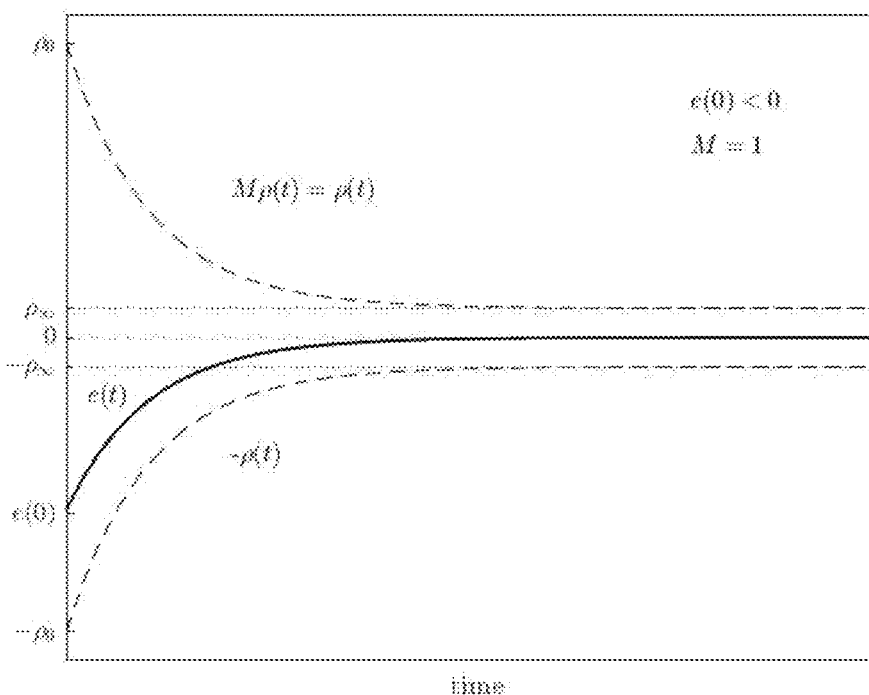
FIG. 5B shows a further tracking error and Prescribed Performance Limits in case of $e(0) < 0$ and $M=1$.

The special cases of Maximum Overshoot Parameter M=0 are depicted in FIG. 4A in case of $e(0) \geq 0$ and FIG. 4B in case of $e(0) < 0$, while the special cases of Maximum Overshoot Parameter M=1 are depicted in FIG. 5A in case of $e(0) \geq 0$ and FIG. 5B in case of $e(0) < 0$.

The constant $\rho_0$ is selected such that (2) is satisfied at t=0, e.g.

$$-M\rho(0) < e(0) < \rho(0), \text{ if } e(0) \geq 0$$

$$-\rho(0) < e(0) < M\rho(0), \text{ if } e(0) < 0$$

The constant $\rho_\infty$ represents the maximum allowable size of $e(t)$ at the steady state that may be set arbitrarily small to a value reflecting the resolution of the measurement device, thus achieving practical convergence of $e(t)$ to zero. Furthermore, the decreasing rate of $\rho(t)$, which is related to the constant l, introduces a lower bound on the required speed of convergence of $e(t)$.

To introduce Prescribed Performance, an error transformation is incorporated modulating the tracking error e(t) with respect to the required performance bounds imposed by $\rho(t)$ and M. More specifically $$\varepsilon(t) = E\left(\frac{e(t)}{\rho(t)}\right) \quad (3)$$

where ε is the transformed error and E(•) is a smooth, strictly increasing Transformation Function defining a bijective mapping:

$$E:(-M,1) \to (-\infty,\infty), \text{ if } e(0) \geq 0$$

$$E:(-1,M) \to (-\infty,\infty), \text{ if } e(0) < 0 \quad (4)$$

A candidate Transformation Function, could be $$E\left(\frac{e(t)}{\rho(t)}\right) = \begin{cases} a \cdot \ln\left(\frac{M + \frac{e}{\rho}}{1 - \frac{e}{\rho}}\right), & \text{if } e(0) \geq 0 \\ a \cdot \ln\left(\frac{1 + \frac{e}{\rho}}{M - \frac{e}{\rho}}\right), & \text{if } e(0) < 0 \end{cases} \quad (5)$$

where $\alpha$ is a positive design constant. Notice that since $\rho(0)$ is selected such that (2) is satisfied at t=0, ε is finite owing to (4).

Figure 6:
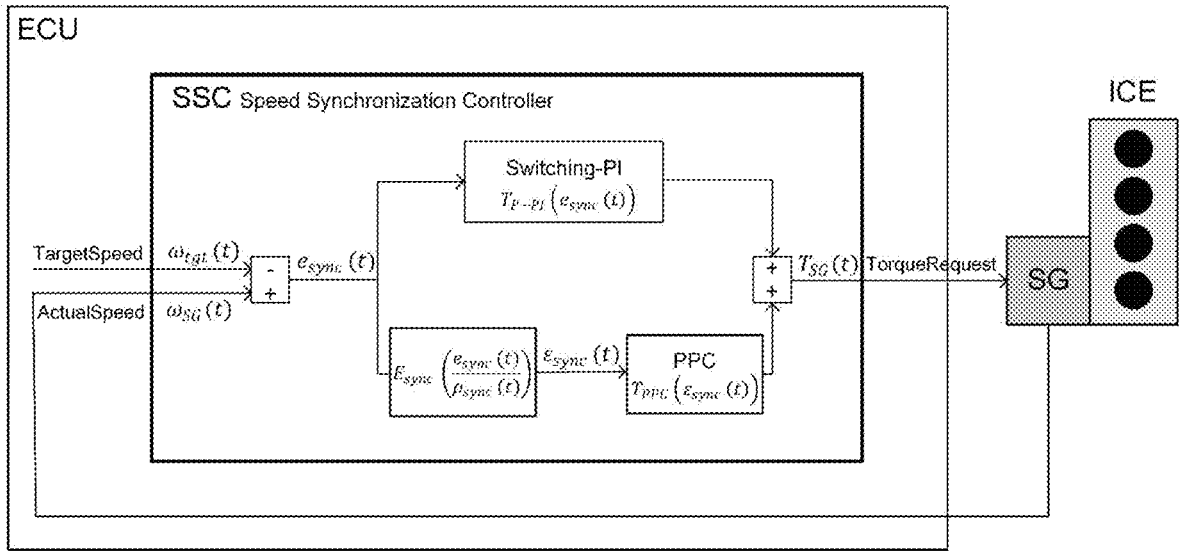
FIG. 6 shows the proposed control scheme.

Design of the Speed Synchronization Controller SSC:

Let the speed synchronization error be defined as the difference between the SG angular actual speed and the SG target speed, i.e. $e_{sync}(t) = \omega_{SG}(t) - \omega_{tgt}(t)$. The goal is to impose certain Prescribed Performance Limits, depicted with dashed line in FIG. 9, as formed by a synchronization Performance Function $\rho_{sync}(t)$ and a synchronization Maximum Overshoot Parameter $M_{sync}$. To this end, an SSC controller, as shown in FIG. 6 is employed, whose output torque $T_{SG}(t)$ is designed as the sum of a PPC part $T_{PPC}(\varepsilon_{sync}(t))$ and a switching-PI part $T_{P-PI}(e_{sync}(t))$ $$T_{SG}(t) = T_{PPC}(\varepsilon_{sync}(t)) + T_{P-PI}(e_{sync}(t)). \quad (6)$$

The PPC part $T_{PPC}(\varepsilon_{sync}(t))$ is constructed with the use of the transformed synchronization error $$\varepsilon_{sync}(t) = E_{sync}\left(\frac{e_{sync}(t)}{\rho_{sync}(t)}\right),$$

where $E_{sync}(\bullet)$ is a synchronization Transformation Function defining a bijective mapping:

$$E_{sync}:(-M_{sync},1) \to (-\infty,\infty), \text{ if } e_{sync}(0) \geq 0$$

$$E_{sync}:(-1,M_{sync}) \to (-\infty,\infty), \text{ if } e_{sync}(0) < 0$$

The switching-PI part $T_{P-PI}(e_{sync}(t))$ is further defined as:

$$T_{P-PI}(e_{sync}(t)) = \begin{cases} T_{PI}(e_{sync}(t)), & |e_{sync}(t)| \leq iDisableThres \\ T_P(e_{sync}(t)), & |e_{sync}(t)| > iDisableThres \end{cases} \quad (7)$$

where $T_{PI}(e_{sync}(t))$ is a PI part, $T_P(e_{sync}(t))$ is a P part and iDisableThres is the integrator disabling error threshold, which determines the condition for the switching between the PI part and P part. Specifically, the $T_{P-PI}(e_{sync}(t))$ is switching according to whether the speed synchronization error $e_{sync}(t)$ is within the region defined by iDisableThres threshold ($|e_{sync}(t)| \leq iDisableThres$), depicted as the area within the dotted lines of FIG. 11, or not.

Figure 11:
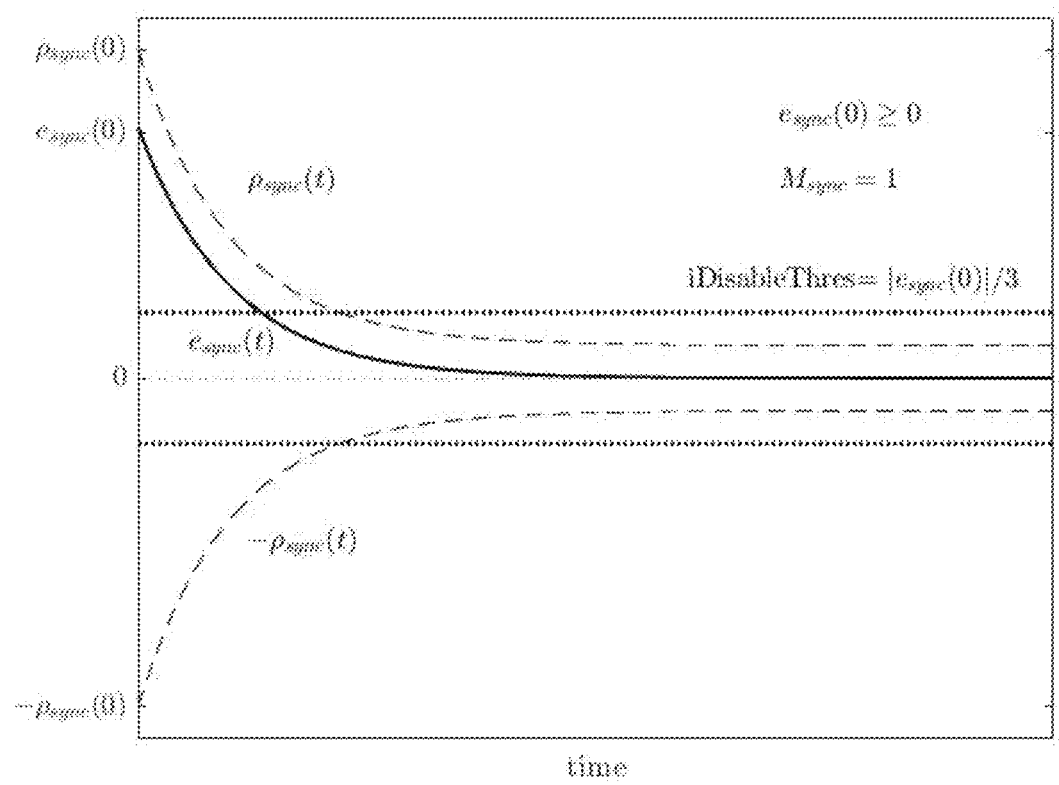
FIG. 11 shows a speed synchronization error and an integrator disabling threshold iDisableThres.

In practice this would indicate that if the speed synchronization error $e_{sync}(t)$ is outside the area defined by iDisableThres ($|e_{sync}(t)| > iDisableThres$), the controller integral part is disabled, whereas if the speed synchronization error is within this area ($|e_{sync}(t)| \leq iDisableThres$), the controller integral part is active. In order for this feature to be effective, the iDisableThres should be chosen less than the initial speed synchronization error ($e_{sync}(0)$). FIG. 11 shows an example where iDisableThres is chosen as ⅓ of the initial speed synchronization error ($e_{sync}(0)$).

The purpose of using the proposed switching-PI part, also known as "conditional integration", is to inhibit the integral term of the controller when the speed synchronization error ($e_{sync}(t)$) is big, in order to avoid large transients due to controller saturation (integrator windup). This may happen in case of large setpoint changes, large disturbances, delays or equipment malfunctions. Integrator windup may also occur when several controller terms are combined, as in our case, in driving the Starter-Generator SG, 1. In such situations, the controller might be easily saturated during transient by the nonlinear PPC term $T_{PPC}(\varepsilon_{sync}(t))$ in FIG. 6. The integral term is active only when the speed $\omega_{SG}(t)$ of SG is very close to the target speed $\omega_{tgt}(t)$, in order to eliminate any steady state errors.

A solution to the Speed Synchronization Problem is provided by demanding the SG torque $T_{SG}(t)$, as calculated by the output of SSC controller of equation (6), shown in FIG. 6.

PPC Protection Against Numerical Errors

An important computational issue of the Prescribed Performance Control PPC lies on the existence of the transformed synchronization error $$\varepsilon_{sync}(t) = E_{sync}\left(\frac{e_{sync}(t)}{\rho_{sync}(t)}\right),$$

calculated with the use of Transformation Function $E_{sync}(\bullet)$. Note that if the speed synchronization error $e_{sync}(t)$ abruptly reaches or surpasses the Prescribed Performance Limits, shown as dashed line in FIG. 9, due to an unexpected disturbance, controller saturation, "change-of-mind" situations, e.t.c., the transformation $E_{sync}(\bullet)$ is not defined, e.g. the argument of the logarithm in (5) is either infinite or negative. This leads to a numerical error in the calculations and fatally causes unexpected system behavior due to controller failure. Such phenomena are met frequently in industrial applications and it is important to protect the controller against them.

Figure 7:
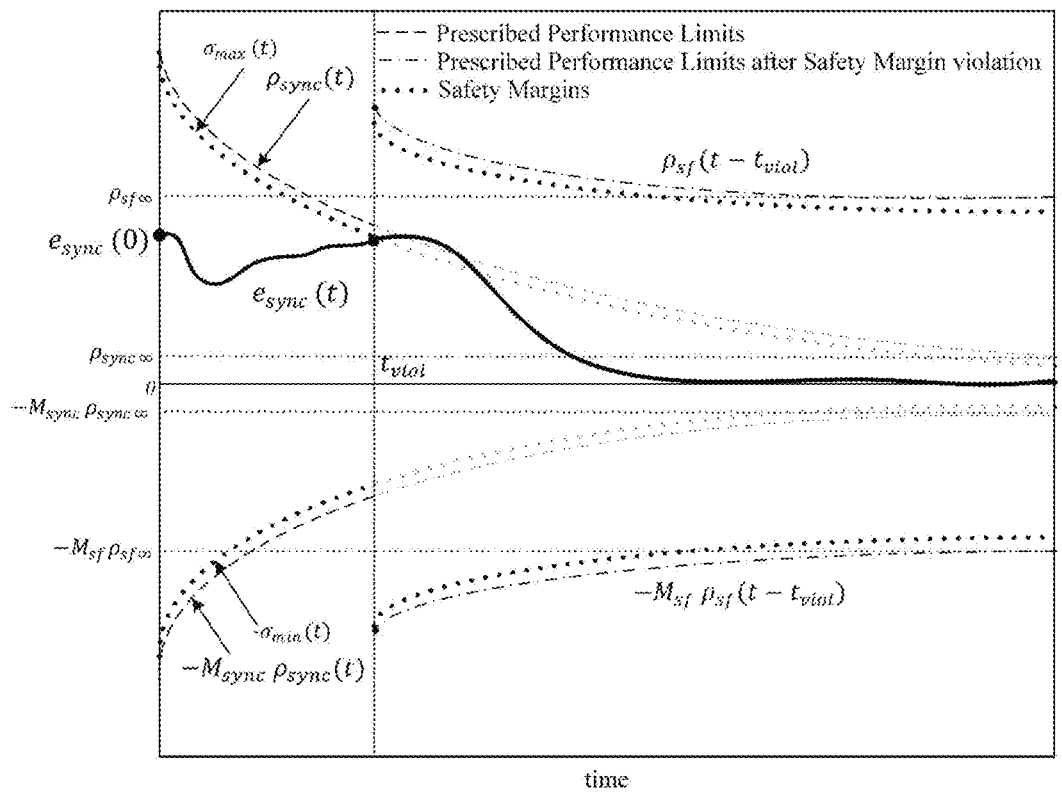
FIG. 7 shows a PPC protection measure.
Figure 8:
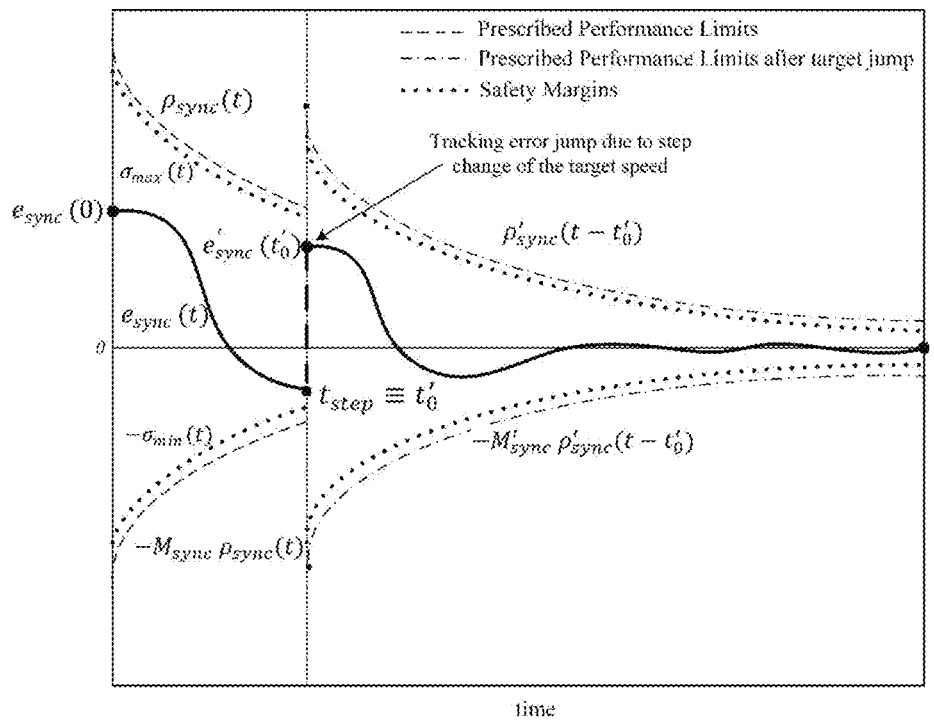
FIG. 8 shows a further PPC protection measure.

Distinction is made between two numerically hazardous cases HCa in FIG. 7 and HCb in FIG. 8, defined as:

Case HCa: Abrupt speed change, which could lead the speed synchronization error $e_{sync}(t)$ outside the Prescribed Performance Limits (dashed line in FIG. 7), due to disturbance, insufficient controller action, e.t.c. (FIG. 7).

Case HCb: "Change-of-mind" situations, where the target speed changes discontinuously during synchronization due to new gear request (FIG. 8).

Safety Margins: Let us define the strictly positive functions $\sigma_{min}(t)$, $\sigma_{max}(t)$, where $0 < \sigma_{min}(t) \leq \sigma_{max}(t)$, satisfying the following inequalities:

$$-M_{sync}\rho_{sync}(t) < -\sigma_{min}(t) < \sigma_{max}(t) < \rho_{sync}(t), \forall t \text{ if } e_{sync}(0) \geq 0$$

$$-\rho_{sync}(t) < -\sigma_{max}(t) < \sigma_{min}(t) < M_{sync}\rho_{sync}(t), \forall t \text{ if } e_{sync}(0) < 0 \quad (8)$$

The functions $\sigma_{min}(t)$, $\sigma_{max}(t)$ define the Safety Margins (dotted lines in FIG. 7, FIG. 8 and FIG. 9) and should be chosen in a reasonable way to be close to the Prescribed Performance Limits (dashed lines in FIG. 7, FIG. 8 and FIG. 9) but yet allow a safe distance from them.

The key idea behind the Safety Margins (dotted lines in FIG. 7, FIG. 8 and FIG. 9) is that whenever the speed synchronization error $e_{sync}(t)$ reaches them, a Safety Margin violation flag is raised (SLimViolFlag=ON in FIG. 9), which indicates that the speed synchronization error $e_{sync}(t)$ could surpass the Prescribed Performance Limits (dashed lines in FIG. 7, FIG. 8 and FIG. 9) in the next time instances. Once the violation flag SLimViolFlag=ON, the controller SSC reacts according to the respective protection measure (see Protection Measures against hazardous cases HCa, HCb). During normal operation, the speed synchronization error $e_{sync}(t)$ should evolve strictly within the Safety Margins (SLimViolFlag=OFF):

$$-\sigma_{min}(t) < e_{sync}(t) < \sigma_{max}(t), \forall t \text{ if } e_{sync}(0) \geq 0$$

$$-\sigma_{max}(t) < e_{sync}(t) < \sigma_{min}(t), \forall t \text{ if } e_{sync}(0) < 0 \quad (9)$$

In order to avoid getting into the aforementioned numerically hazardous situations, the following protection strategies are defined.

Protection Measures Against Hazardous Cases HCa, HCb:

In case of HCa (FIG. 7): If an unexpected condition forces the speed synchronization error $e_{sync}(t)$ to reach the Safety Margins (dotted line in FIG. 7) at the time instance $t=t_{viol}$, the Prescribed Performance Limits (dashed line in FIG. 7) are immediately expanded with the choice of a safe Performance Function $\rho_{sf}(t)$ and safe Maximum Overshoot Parameter $M_{sf}$, such that the speed synchronization error $e_{sync}(t)$ would continue to evolve within the safe Prescribed Performance Limits (dash-dotted line in FIG. 7). This is achieved with the use of a safe Transformation Function $E_{sf}(\bullet)$, defining a defining bijective mapping:

$$E_{sf}:(-M_{sf},1) \to (-\infty,\infty), \text{ if } e_{sync}(0) \geq 0$$

$$E_{sf}:(-1,M_{sf}) \to (-\infty,\infty), \text{ if } e_{sync}(0) < 0$$

that constitutes the transformed synchronization error $$\varepsilon_{sync}(t) = E_{sf}\left(\frac{e_{sync}(t)}{\rho_{sf}(t)}\right).$$

Note that such an unexpected situation (e.g. abrupt persistent disturbance) could prohibit an optimal synchronization performance by the available control effort (controller saturation). The characteristics of the safe Prescribed Performance Limits and their main difference with respect to the synchronization Prescribed Performance Limits is that they have to be chosen in a less constrained manner, in order to allow the speed synchronization error $e_{sync}(t)$ retain higher values and lower speed of convergence, without the risk of inducing numerical errors. E.g. the convergence region of the safe Prescribed Performance Limits, defined by $\rho_{sf}$ and $M_{sf}$, has to be larger than the convergence region of the synchronization Prescribed Performance Limits, defined by $\rho_{sync\infty}$ and $M_{sync}$, i.e. $-M_{sf} \cdot \rho_{sf\infty} < -M_{sync} \cdot \rho_{sync\infty} < \rho_{sync\infty} < \rho_{sf\infty}$, in case of $e_{sync}(0) \geq 0$.

In case of HCb: If a "change-of-mind" situation takes place at the time instance $t=t_{step}$, then the synchronization cycle is interrupted and re-initialized, using a new Performance Function $\rho'_{sync}(t)$, and new Maximum Overshoot Parameter $M'_{sync}$, defining the new synchronization Performance Limits (dash-dotted line in FIG. 8). The new Performance Function $\rho'_{sync}(t)$ has to be chosen such that the new initial speed synchronization error $e'_{sync}(t'_0)$ lies within the new Prescribed Performance Limits and the new Maximum Overshoot Parameter $M'_{sync}$ has to be chosen in a way to reflect the maximum allowed overshoot according to the desired synchronization performance.

Figure 10:
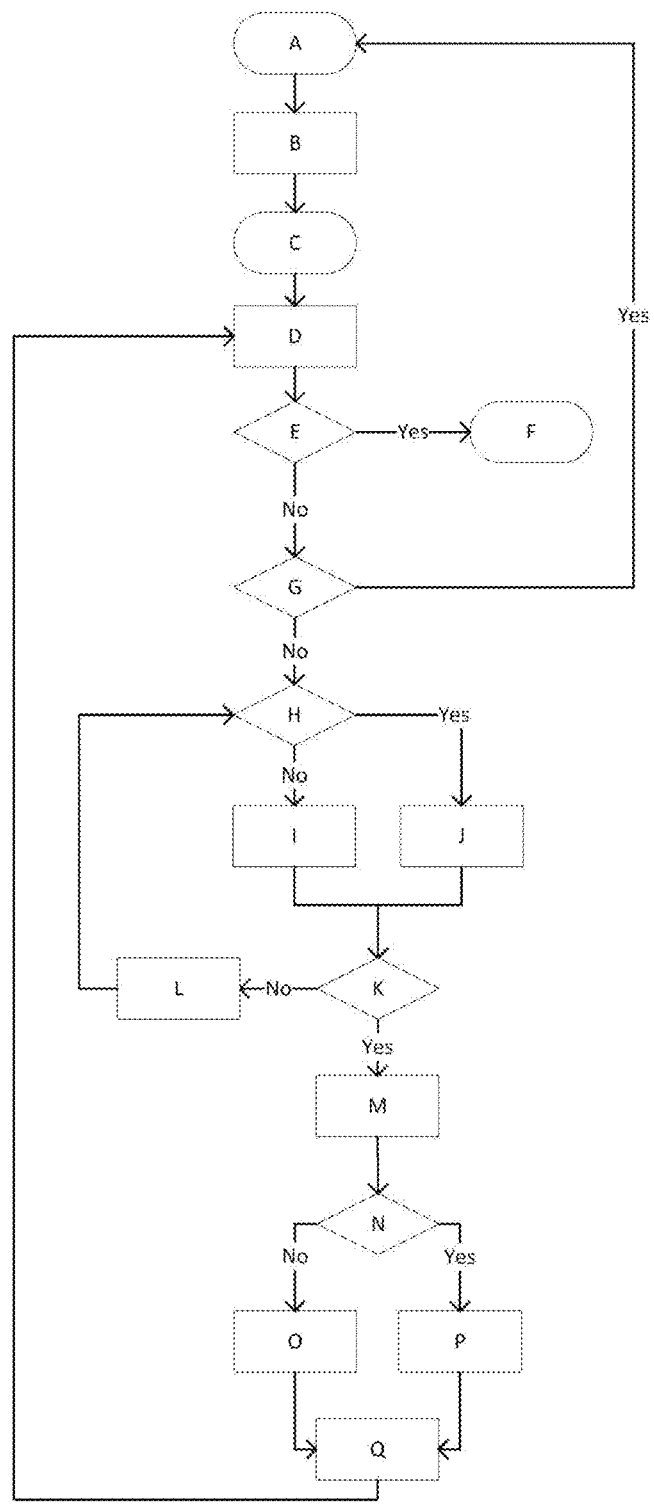
FIG. 10 shows a synchronization algorithm flowchart diagram.

The aforementioned hazardous cases HCa, HCb may occur more than once within a single synchronization cycle. Therefore, both conditions should be checked at every single iteration of the synchronization cycle, i.e. steps G and H of the synchronization algorithm flowchart diagram (FIG. 10).

Figure 9:
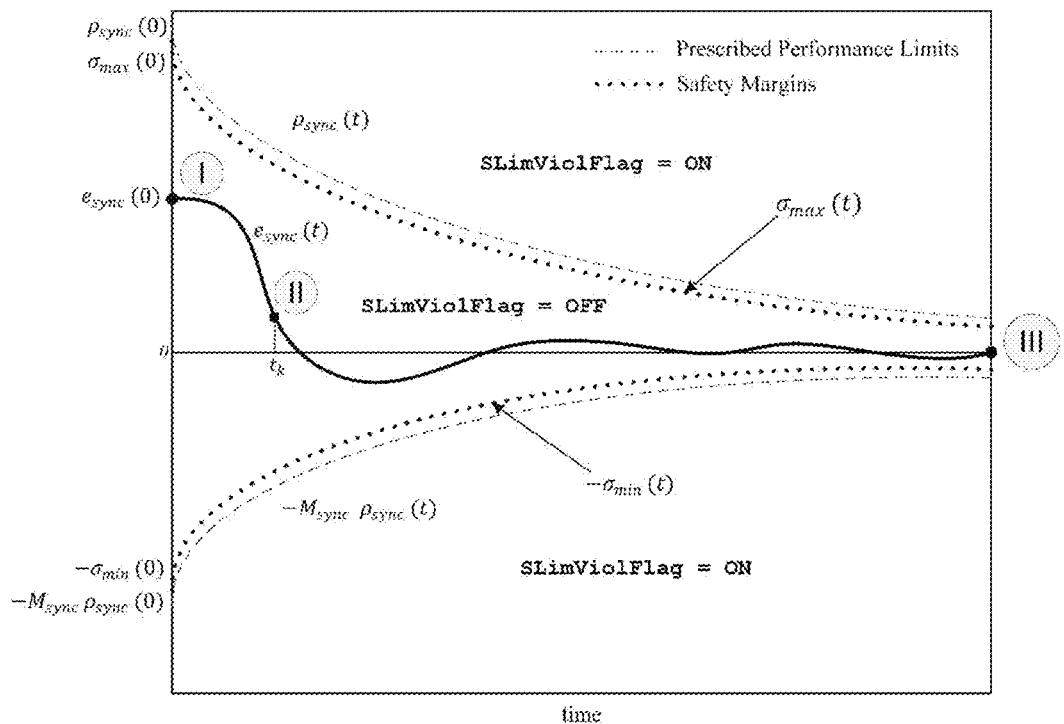
FIG. 9 shows a synchronization cycle.

Description of the Synchronization Cycle Steps in FIG. 9:

Step I—Initialization in FIG. 9:

Calculate the initial speed synchronization error $e_{sync}(0)$,

Choose the form of the synchronization Performance Function ($\rho_{sync}(t)$) and the corresponding Maximum Overshoot Parameter ($M_{sync}$), Choose the form of the Safety Margin functions $\sigma_{min}(t)$, $\sigma_{max}(t)$, Set the Safety Margin violation flag SLimViolFlag=OFF, Step II—k-Th Step of the Synchronization Cycle, See FIG. 9:

Calculate the speed synchronization error $e_{sync}(t)$ at the specific time instance $t_k$, Calculate the actual value of synchronization Performance Function $\rho_{sync}(t)$ at the specific time instance $t_k$, Calculate the Safety Margins $\sigma_{min}(t)$, $\sigma_{max}(t)$ at the specific time instance $t_k$, Calculate the transformed synchronization error $\varepsilon_{sync}(t)$ at the specific time instance $t_k$:

$$\varepsilon_{sync} = E_{sync}\left(\frac{e_{sync}}{\rho_{sync}}\right),$$

if the Safety Margin violation flag SLimViolFlag=OFF, using the synchronization Performance Function $\rho_{sync}(t)$ and synchronization Maximum Overshoot Parameter $M_{sync}$ through the synchronization Transformation Function $E_{sync}(\bullet)$, $$\varepsilon_{sync} = E_{sf}\left(\frac{e_{sync}}{\rho_{sf}}\right),$$

if the Safety Margin violation flag SLimViolFlag=ON (case HCa), using the safe Performance Function $\rho_{sf}(t)$ and safe Maximum Overshoot Parameter $M_{sf}$ through the safe Transformation Function $E_{sf}(\bullet)$, If a new target speed is requested (case HCb), interrupt the synchronization process and re-initialize the synchronization cycle (go to Step I—Initialization in FIG. 9)

Calculate the requested motor torque:

If $|e_{sync}(t)| \leq$ iDisableThres, $T_{SG}(t) = T_{PPC}(\varepsilon_{sync}(t)) + T_{PI}(e_{sync}(t))$ If $|e_{sync}(t)| >$ iDisableThres, $T_{SG}(t) = T_{PPC}(\varepsilon_{sync}(t)) + T_P(e_{sync}(t))$ Request the SG torque $T_{SG}(t)$.

Step III (in FIG. 9)—End of the Synchronization Cycle:

If the speed synchronization error $e_{sync}(t)$ remains within a prespecified region defined by the threshold MinErrThres for a specific time period $\Delta t$, which may be detected and indicated by a Synchronization Error Debouncer (shown in FIG. 2):

$|e_{sync}(t)| \leq$ MinErrThres for $\Delta t =$ SyncErrDebounceTime then the synchronization is over, and gear may be engaged. Whereby SyncErrDebounceTime is the synchronization error debounce time period that signifies the successful completion of the synchronization cycle.

FIG. 10 shows synchronization algorithm flowchart diagram:

Step A—Initialization,
Step B—Calculate the initial speed synchronization error $e_{sync}(0)$,
  Choose the synchronization Performance Function $\rho_{sync}(t)$,
  Choose synchronization Maximum Overshoot Parameter $M_{sync}$,
  Choose the Safety Margins $\sigma_{min}(t)$, $\sigma_{max}(t)$,
  Set the Safety Margin violation flag SLimViolFlag=OFF,
Step C—Start the synchronization cycle,
Step D—Calculate the speed synchronization error $e_{sync}(t)$,
Step E—Check if $|e_{sync}(t)| \leq$ MinErrThres for $\Delta t \geq$ SyncErrDebounceTime,
  If Yes: to to step F,
  If No: go to step G,
Step F—End of synchronization cycle,
Step G—Check if there is a "change-of-mind" situation (case HCb),
  If Yes: go to Step A,
  If No: go to step H,
Step H—Check if the Safety Margin violation flag SLimViolFlag==ON (case HCa),
  If Yes: go to step J,
  If No: go to step I,
Step I—Use the synchronization Performance Function $\rho_{sync}(t)$ and synchronization Maximum Overshoot Parameter $M_{sync}$,
Step J—Use the safe Performance Function $\rho_{sf}(t)$ and safe Maximum Overshoot Parameter $M_{sf}$,
Step K—Check if the speed synchronization error $e_{sync}(t)$ is within the Safety Margins,
  If No: go to step L,
  If Yes: go to step M,
Step L—Set the Safety Margin violation flag SLimViolFlag=ON (HCa), continue with step H,
Step M—Calculate the transformed synchronization error $E_{sync}(t)$,
Step N—Check if $|e_{sync}(t)| \geq$ iDisableThres, (see also FIG. 11)
  If No: go to step O,
  If Yes: go to step P,
Step O—Calculate the speed controller output
  $T_{SG}(t)=T_{PPC}(\varepsilon_{sync}(t))+T_{PI}(e_{sync}(t))$, (see also FIG. 6 in combination with equation (7)),
Step P—Calculate the speed controller output
  $T_{SG}(t)=T_{PPC}(\varepsilon_{sync}(t))+T_{P}(e_{sync}(t))$, (see also FIG. 6 in combination with equation (7)),
Step Q—Set the requested SG torque $T_{SG}(t)$.

Step Q signifies the final step of a single iteration of the synchronization cycle (e.g. 1st iteration). Once the first iteration is finished at step Q, a second iteration is started by going back to step D. This iteration is repeated until step E is true and the synchronization is finished with step F.

A method of controlling a vehicle drivetrain by an electric motor (1, SG), in order to synchronize the speed of an internal combustion engine (3, ICE) and the speed of gears in the drivetrain, wherein if a speed synchronization error $e_{sync}(t)$ is controlled to remain within a prespecified region for a specific period of time, the synchronization is finished, and a gear may be engaged.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE

1 Starter-Generator
2 electronic control unit
3 internal combustion engine
4 gearbox
5 gear actuator
6 electric machine
A to R step
DHT Dedicated Hybrid Transmission
ECU electronic control unit
ED electric drive
SG Starter-Generator
ICE internal combustion engine
e(t) tracking error
$\varepsilon(t)$ transformed error
$e_{sync}(t)$ speed synchronization error
$\varepsilon_{sync}(t)$ transformed synchronization error
$\omega_{tgt}$ target angular speed
$\omega_{SG}$ angular velocity of the SG rotor
$v_{veh}$ velocity of the vehicle
$r_{wheel}$ radius of a wheel
$i_{tgt}$ target gear ratio
$T_{SG}$ torque of SG
$T_{ICE}$ torque of ICE
PPC Prescribed Performance Control
PI Proportional-Integral
P Proportional
$T_{PPC}$ PPC part
$T_{P-PI}$ switching-PI part
$T_{PI}$ PI part
$T_P$ P part
E(•) Transformation Function
$E_{sync}$(•) synchronization Transformation Function
$E_{sf}$(•) safe Transformation Function
$\rho(t)$ Performance Function
$\rho_{sync}(t)$ synchronization Performance Function
$\beta_{sf}(t)$ safe Performance Function
M Maximum Overshoot Parameter
$M_{sync}$ synchronization Maximum Overshoot Parameter
$M_{sf}$ safe Maximum Overshoot Parameter
HCa, HCb Hazardous Case a, Hazardous Case b
$\sigma_{min}(t)$, $\sigma_{max}(t)$ Safety Margin functions
MinErrThresh minimum error threshold
SyncErrDebounceTime synchronization error debouncer
SLimViolFlag Safety Margin violation flag
iDisableThres integrator disabling threshold
SSC speed synchronization controller

What is claimed is:

1. A method of controlling a drivetrain of a vehicle by an electric motor to synchronize a speed of an internal combustion engine and a speed of gears in the drivetrain, comprising:
  during an initialization step:
    determining an initial speed synchronization error ($e_{sync}(0)$) based on a difference between an angular speed and a target speed of a starter-generator of the vehicle,
    determining a form of a synchronization Performance Function ($\rho_{sync}(t)$) and a synchronization Maximum Overshoot Parameter ($M_{sync}$) wherein the form of the synchronization Performance Function ($\rho_{sync}(t)$) and the synchronization Maximum Overshoot Parameter ($M_{sync}$) define performance limits,
determining a form of Safety Margin functions ($\sigma_{min(t)}$), ($\sigma_{max(t)}$), and
setting a Safety Margin violation flag (SLimViolFlag) to be OFF,
during a synchronization cycle:
determining a speed synchronization error ($e_{sync}(t)$) at a specific time instance $t_k$,
determining an actual value of the synchronization Performance Function ($\rho_{sync}(t)$) at the specific time instance $t_k$,
determining the Safety Margins ($\sigma_{min(t)}$), ($\sigma_{max(t)}$) at the specific time instance $t_k$,
determining a transformed synchronization error ($\varepsilon_{sync}(t)$) at the specific time instance $t_k$ by way of:

$$\varepsilon_{sync} = E_{sync}\left(\frac{e_{sync}}{\rho_{sync}}\right),$$

when the Safety Margin violation flag (SLimViolFlag) is OFF, using the synchronization Performance Function ($\rho_{sync}(t)$) and the synchronization Maximum Overshoot Parameter ($M_{sync}$) by using the synchronization Transformation Function $E_{sync}(\cdot)$, $$\varepsilon_{sync} = E_{sf}\left(\frac{e_{sync}}{\rho_{sf}}\right),$$

if the Safety Margin violation flag (SLimViolFlag) is ON, using a safe Performance Function ($\rho_{sync}(t)$) and a safe Maximum Overshoot Parameter ($M_{sf}$) by using the safe Transformation function $E_{sf}(\cdot)$,
when a new target speed ($\omega_{tgt}$) is requested, interrupt the synchronization process and re-initialize the synchronization cycle (go to the initialization step),
determining a requested motor torque $T_{SG}(t)$ as an output of a Speed Synchronization Controller (SSC):
If $|e_{sync}(t)| \leq$ iDisableThres, $(T_{SG}(t)) = [T_{PPC}(\varepsilon_{sync}(t)) + T_{PI}(e_{sync}(t))$,
If $|e_{sync}(t)| >$ iDisableThres, $(T_{SG}(t)) = T_{PPC}(\varepsilon_{sync}(t)) + T_P(e_{sync}(t))$, where iDisableThres is an integrator disabling error threshold, which determines the condition for the switching between the PI part and P part;
set the requested SG torque $T_{SG}(t)$,
during an End of the synchronization cycle:
when the speed synchronization error $e_{sync}(t)$ remains within a prespecified region for a specific time period $\Delta t$, completing the synchronization of the speed of the internal combustion engine and the speed of the gears in the drivetrain.

2. The method of claim 1, further comprising the steps of engaging gear in the drivetrain when the synchronization is finished.

3. The method of claim 1, further comprising:
choosing the synchronization Performance Function ($\rho_{sync}(t)$) the synchronization Maximum Overshoot Parameter ($M_{sync}$) and the Safety Margins ($\sigma_{min(t)}$), ($\sigma_{max(t)}$) such that $-M_{sync}\, \rho_{sync}(0) < -\sigma_{min(0)} < e_{sync}(0) < \sigma_{max(t)} < \rho_{sync}(0))$,
if $e_{sync}(0) \geq$ $-\rho_{sync}(0) < -\sigma_{max(0)} < e_{sync}(0) < \sigma_{min(0)} < M_{sync}\, \rho_{sync}(0)$,
if $e_{sync}(0) <$.

4. The method of claim 1, wherein the safety margins ($\sigma_{min(t)}$), ($\sigma_{max(t)}$) satisfy the conditions $0 < \sigma_{min(t)} \leq \sigma_{max(t)}$ and $-M_{sync}\, \rho_{sync}(t) < -\sigma_{min(t)} < \sigma_{max(t)} < \rho_{sync}(t),\ \forall t$ if $e_{sync}(0) \geq 0$ $-\rho_{sync}(t) < -\sigma_{max(t)} < \sigma_{min(t)} < M_{sync}\, \rho_{sync}(t),\ \forall t$ if $e_{sync}(0) < 0$.

5. The method of claim 1, further comprising:
setting the Safety Margin violation flag (SLimViolFlag) to be OFF or remaining OFF when the speed synchronization error $e_{sync}(t)$ lies within the Safety Margins ($\sigma_{min(t)}$) ($\sigma_{max(t)}$), which are within and at a safety distance of the Prescribed Performance Limits, and set to be ON or remaining ON when the speed synchronization error $e_{sync}(t)$ lies on the Safety Margins ($\sigma_{min(t)}$), ($\sigma_{max(t)}$) or surpasses them.

6. The method of claim 5, wherein upon an abrupt speed change, if the speed synchronization error $e_{sync}(t)$ is forced to reach the Safety Margin ($\sigma_{min(t)}$), ($\sigma_{max(t)}$) at a time instance $t_{viol}$, the Prescribed Performance Limits are expanded with the choice of a safe performance function $\rho_{sf}(t)$ and a safe Maximum Overshoot Parameter $M_{sf}$, such that the speed synchronization error $e_{sync}(t)$ continues to evolve within expanded Prescribed Performance Limits.

7. The method of claim 6, wherein upon a "change-of-mind" situation at the time instance $t = t_{step}$, the synchronization cycle is interrupted and re-initialized, using a new Performance Function $\rho_{sync}'(t)$ and a new Maximum Overshoot Parameter $M_{sync}'$, which are chosen such that the speed synchronization error $e_{sync}(t)$ continues to evolve within new Prescribed Performance Limits.

8. The method of claim 1, further comprising:
determining the transformed synchronization error $\varepsilon_{sync}(t)$ by the equation $$\varepsilon_{sync} = \begin{cases} E_{sync}\left(\frac{e_{sync}}{\rho_{sync}}\right), & \text{if } SLimViolFlag = \text{OFF} \\ E_{sf}\left(\frac{e_{sync}}{\rho_{sf}}\right), & \text{if } SLIMViolFlag = \text{ON} \end{cases},$$

where the synchronization Transformation Function $E_{sync}(\cdot)$ and the safe Transformation Function $E_{sf}(\cdot)$ are smooth, strictly increasing functions.

9. The method according to claim 8, wherein the steps of the synchronization Transformation Function $E_{sync}(\cdot)$ is defining a bijective mapping:

$E_{sync}:(-M_{sync},1) \to (-\infty,\infty),$ if $e_{sync}(0) \geq 0$ $E_{sync}:(-1,M_{sync}) \to (-\infty,\infty),$ if $e_{sync}(0) < 0$ and the safe Transformation Function $E_{sf}(\cdot)$ is defining a bijective mapping:

$E_{sf}:(-M_{sf},1) \to (-\infty,\infty),$ if $e_{sync}(0) \geq 0$ $E_{sf}:(-1,M_{sf}) \to (-\infty,\infty),$ if $e_{sync}(0) < 0$.

10. The method of claim 1, further comprising the steps of:
providing speed synchronization controller (SSC);
providing a vehicle having the drivetrain; and
synchronizing the speed of the internal combustion engine and the speed of gears in the drivetrain.

11. The method of claim 10, further comprising:
providing a Prescribed Performance Control PPC part ($T_{PPC}(\varepsilon_{sync}(t))$); and
calibrating the Prescribed Performance Control PPC part ($T_{ppG}(\varepsilon_{sync}(t))$) to retain the speed synchronization error ($e_{sync}(t)$) within the Prescribed Performance Limits at all time.

12. The method of claim 10, further comprising:
providing a switching-PI part $T_{P-PI}(e_{sync}(t))$, the a switching-PI part $T_{P-PI}(e_{sync}(t))$ switching between a PI part $T_{PI}(e_{sync}(t))$ and a P part ($T_P(e_{sync}(t))$) according to whether the speed synchronization error ($e_{sync}(t)$) is within a specific threshold or not.

13. The method of claim 10, further comprising:
providing an electronic control unit (ECU), the speed synchronization controller (SSC) being part of the electronic control unit (ECU);
providing a DHT Manager being part of the electronic control unit (ECU);
controlling the vehicle with the electronic control unit (ECU); and
supervising the speed synchronization controller (SSC) with the DHT Manager.

14. The method of claim 13, further comprising:
providing an internal combustion engine being part of the drivetrain;
providing a gearbox having an output shaft and being part of the drivetrain, the internal combustion engine coupled to the gear box;
providing dog clutches having an input side, the dog clutches being part of the gearbox; and
an electric machine integrated on the input side of the dog clutches in a P0, P1 or P2 configuration;
transferring torque from the internal combustion engine to the output shaft of the gearbox.

15. The method of claim 14, further comprising:
providing the electric machine to be a Starter-Generator (SG) coupled to a crankshaft of the internal combustion engine.

* * * * *